(12) United States Patent
Slabbinck et al.

(10) Patent No.: US 12,128,423 B2
(45) Date of Patent: Oct. 29, 2024

(54) MATERIAL SEPARATION SYSTEM

(71) Applicant: SUEZ GROUPE, Paris la Defense (FR)

(72) Inventors: Rik Slabbinck, Merelbeke (BE); Peter Baert, Ghent (BE); Simon Waroquier, Anderlecht (BE); Thierry Vlieghe, Haasdonck (BE)

(73) Assignee: VIGIE GROUP, Paris (FR)

( * ) Notice: Subject to any disclaimer, the term of this patent is extended or adjusted under 35 U.S.C. 154(b) by 0 days.

(21) Appl. No.: 18/254,335

(22) PCT Filed: Nov. 25, 2021

(86) PCT No.: PCT/EP2021/083046
§ 371 (c)(1),
(2) Date: May 24, 2023

(87) PCT Pub. No.: WO2022/112444
PCT Pub. Date: Jun. 2, 2022

(65) Prior Publication Data
US 2024/0100542 A1 Mar. 28, 2024

(30) Foreign Application Priority Data
Nov. 26, 2020 (EP) .................................. 20306453

(51) Int. Cl.
*B03C 1/30* (2006.01)
*B03C 1/247* (2006.01)
(Continued)

(52) U.S. Cl.
CPC ............... *B03C 1/30* (2013.01); *B03C 1/247* (2013.01); *B65G 15/62* (2013.01); *B65G 43/02* (2013.01); *B03C 2201/20* (2013.01)

(58) Field of Classification Search
CPC ........ B03C 1/30; B03C 1/247; B03C 2201/20; B65G 15/62; B65G 43/02
(Continued)

(56) References Cited

U.S. PATENT DOCUMENTS 3,448,857 A 6/1969 Benson et al.
4,674,626 A * 6/1987 Adcock .................. B65G 15/60
198/720

(Continued)

FOREIGN PATENT DOCUMENTS

CA 2627339 A1 * 11/2007 ............. B03B 13/00
CN 104773436 A 7/2015
(Continued)

OTHER PUBLICATIONS

International Search Report for PCT/EP2021/083046 mailed Mar. 17, 2022, 4 pages.
(Continued)

*Primary Examiner* — Terrell H Matthews
(74) *Attorney, Agent, or Firm* — NIXON & VANDERHYE

(57) ABSTRACT

A material separator system including a separation device to separate at least a first group and a second group of material from an incoming stream of material; the stream of material laying on a conveyor belt and being carried along a longitudinal axis to a separation device; the material separator system including at least one air nozzle adapted to blow air between the conveyor belt and the support table in order to create an air-cushion in-between.

10 Claims, 3 Drawing Sheets

(51) Int. Cl.
*B65G 15/62* (2006.01)
*B65G 43/02* (2006.01)

(58) Field of Classification Search
USPC ......................................................... 209/231
See application file for complete search history.

(56) References Cited

U.S. PATENT DOCUMENTS

| | | | | |
|---|---|---|---|---|
| 5,194,050 | A * | 3/1993 | Muraishi | B65G 39/071 |
| | | | | 474/101 |
| 5,219,063 | A * | 6/1993 | Wyatt | B65G 39/16 |
| | | | | 198/840 |
| 5,893,701 | A * | 4/1999 | Pruett | B65G 47/32 |
| | | | | 414/798.2 |
| 7,726,493 | B2 * | 6/2010 | Van Der Weijden | B03B 9/04 |
| | | | | 209/218 |
| 9,339,848 | B2 * | 5/2016 | Berkhout | B07B 13/116 |

FOREIGN PATENT DOCUMENTS

| | | | |
|---|---|---|---|
| DE | 8709533 U1 | 8/1987 | |
| FR | 2077429 A7 * | 1/1971 | |
| FR | 2086154 A1 * | 4/1971 | |
| FR | 2090325 A1 * | 5/1971 | |
| FR | 2723357 A1 * | 2/1996 | ............ B65G 15/60 |
| JP | H06329229 A | 11/1994 | |
| JP | 2011001145 A * | 1/2011 | |

OTHER PUBLICATIONS

Written Opinion of the ISA for PCT/EP2021/083046 mailed Mar. 17, 2022, 6 pages.

* cited by examiner

MATERIAL SEPARATION SYSTEM

CROSS-REFERENCE TO RELATED APPLICATIONS

This application is the U.S. national phase of International Application No. PCT/EP2021/083046 filed Nov. 25, 2021, which designated the U.S. and claims priority to EP 20306453.0 filed Nov. 26, 2020, the entire contents of each of which are hereby incorporated by reference.

TECHNICAL FIELD

The invention relates to the field of material separation, for instance in the field of waste processing.

BACKGROUND OF THE INVENTION

Several million tons of ashes are produced each year by incinerating household waste. Incineration bottom ash (also known as IBA) in particular contains approximatively 90% of minerals, 4-8% of ferrous metals and approximatively 2%-6% of non-ferrous metals. In order to recycle optimally the incineration bottom ashes, a complete separation of the metal parts is decisive, as the high proportion of minerals can further be recycled into alternative building material.

Dry and wet processes for ash removal provides high metal separation efficiency, in particular in the fine grain area (for instance up to 50% of particles with a diameter under 10 mm, and up to 30% of particles with a diameter under 4 mm). These fine fractions usually contain a particularly high proportion of recyclable heavy metals, such as copper. With the incineration of electronic components, and increasingly smaller elements in the household waste, there are now a significant proportion of precious metals, such as gold and silver, amongst the particles under 2 mm. These particles further contain valuable metals such as aluminum.

Metallurgical slag and used foundry sands also have a high content in metals which can be recycled. Slag is a waste produced during metallurgical smelting processes. When solid, they often include large pieces of metal or enveloped metal particles.

Many kinds of separators are known in the art, in function of the type of material to separate.

Mechanical processing, after proper grinding and grading, using eddy current separators, is particularly well suited to sort such non-ferrous metal contained in IBA, slag and sands. For instance, the salt slags produced during the production of secondary aluminum include about 5 to 10% of aluminum, which can be well recovered with suitable processes.

For instance, when it is required to separate a mixture of non-ferrous metals and mineral-rich particles, it is known to use an Eddy-Current Separator comprising a conveyor belt, mounted on a support table, for conveying particles to sort and means to produce an electromagnetic field, having lines of force disposed in a direction through said belt to said particles, as disclosed for instance in patent publication U.S. Pat. No. 3,448,857A.

Such electromagnetic field can be generated for instance by a rotating assembly of permanent magnets, or a driven electromagnetic device.

The electromagnetic field generates at an end of the conveyor a repulsion force applied to the non-ferrous metals. A splitter device is installed at the end of the conveyor, and the repulsion force applied to the non-ferrous metals pushes them above the splitter, while the other materials, like minerals, fall by gravity under the splitter.

In such Eddy-Current separator, the sorting is effective when a good balance is found between conveying speed, electromagnetic force applied to the particles and the splitter position. To this end, the position of the splitter is generally determined as a function of the grain size of the material to separate, the electromagnetic field produced, and the speed of the conveying device. If one of these parameters changes during the processing, then the material may be incorrectly separated and the sorting yield decrease.

Therefore, the control of the conveying speed and the electromagnetic generator device is a key point of the Eddy-Current Separator.

However, frictions may occur due to change in temperature, humidity or simply to wear. Also, when sorting non-ferrous metals in a stream of small grain material, said small grains tend to accumulate beneath the conveyor belt, creating friction and slowing down the conveying speed. Such modification of the speed creates a variation of the parameters of the system and decrease the sorting yield and quality.

In a more general way, and for any kind of conveyed material separators, like sensor sorter, X-ray sorter, an irregular speed of conveying has a high impact on sorting yield and quality.

As a consequence, there is a need for an improved material separator system.

SUMMARY OF THE INVENTION

It is thus hereby proposed a material separator system comprising a separation device to separate at least a first group and a second group of material from an incoming stream of material, the material separator system comprising a conveying device to convey said incoming stream of material to the separation device, said conveying device comprising a motorized conveyor belt translating over a support table, the stream of material laying on the conveyor belt and being carried along a longitudinal axis to the separation device.

The material separator system comprises at least one air nozzle adapted to blow air between the conveyor belt and the support table in order to create an air-cushion in-between.

In this case, an air-cushion is a volume of air creating a physical separation between the conveyor belt and the support table.

Therefore, such material separation system avoids friction to occur between the belt and its support, thus ensuring a constant speed of translation of the conveying belt on the support table. As a result, the sorting yield and quality is improved and constant over time.

Advantageously, said at least one air nozzle is installed on a lateral side of the conveyor belt oriented parallel to the plane of the support table, in a transversal direction, perpendicular to the longitudinal axis. Therefore, the nozzle can be easily installed, especially on existing systems, and such nozzle orientation help cleaning the materiel that seeped beneath the conveying belt.

Advantageously, the material separator system comprises a plurality of air nozzles, mounted regularly on the side of the conveyor belt along the longitudinal axis. Therefore, a constant and efficient air cushion can be generated, even on long and/or heavy conveying belt.

Advantageously, said at least one air nozzle is mounted in the support table, under the conveyor belt, and oriented perpendicular or oblique to the plane of the support table. This arrangement generated a regular, constant and powerful air cushion.

Advantageously, the plurality of air nozzles is distributed on the area of the support table under the conveyor belt. Such regular distribution produces a regular air-cushion all over the surface of the table support.

Particularly, the air nozzles are aligned so as to form a matrix of nozzles distributed below the conveyor belt. This distribution in a Matrix shape is an easy to design and efficient distribution to obtain a regular air-cushion under the conveying belt.

In particular the separation device comprises an Eddy-current separator, which is a very relevant device for separating non-ferrous metals amongst a stream of material.

The invention also related to a control method of a material separator system as described, wherein it comprises the steps of:
  Detecting an instability of the conveyor belt speed;
  Activating the at least one air nozzle when said instability is detected.

This method is energetically economic way to drive the air nozzles, by blowing air and creating the air cushion only when an instability of the conveying belt is detected.

Advantageously, the instability is detected by tracking the current variation of a motor driving the conveying belt and/or tracking the instantaneous velocity of the conveying belt, for instance with a tachometer.

Advantageously the method comprises a step of stopping the at least one air nozzle after a predetermined time limit. Therefore the at least one air nozzle is running only for a limited period of time, thus optimizing power consumption of the system.

In particular, the time limit may be a fixed period of time after the activation of the at least one air nozzle, or a continuous period of time after said activation during which no instability of the conveyor belt speed is detected. These two options give some easy to implement and relevant time-based criteria to stop the air nozzle.

The invention also relates to another control method of a material separator system as described, wherein it comprises the steps of:
  Detecting an activation of the conveyor belt or the activation of the separation device or the power supply of the material separator system; and
  Activating the at least one air nozzle when said activation or power supply is detected.

This generates a permanent air-cushion when the material separation system is active.

Advantageously, said other control method comprises a step of stopping the at least one air nozzle after a fixed period of time starting from the activation of the at least one air nozzle. This gives an easy to implement and relevant time-based criteria to stop the air nozzle.

The invention also relates to a method for separating an incoming stream of material on a material separator system as described previously, comprising the steps of:
  starting the conveyor belt;
  starting the separation device;
  providing an incoming stream of material to separate on the conveyor belt; and
  while the separation device is running, implementing the steps of a method for controlling a material separator system as exposed previously.

Particularly, the incoming stream of material comprises or consists of incinerator bottom ashes.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
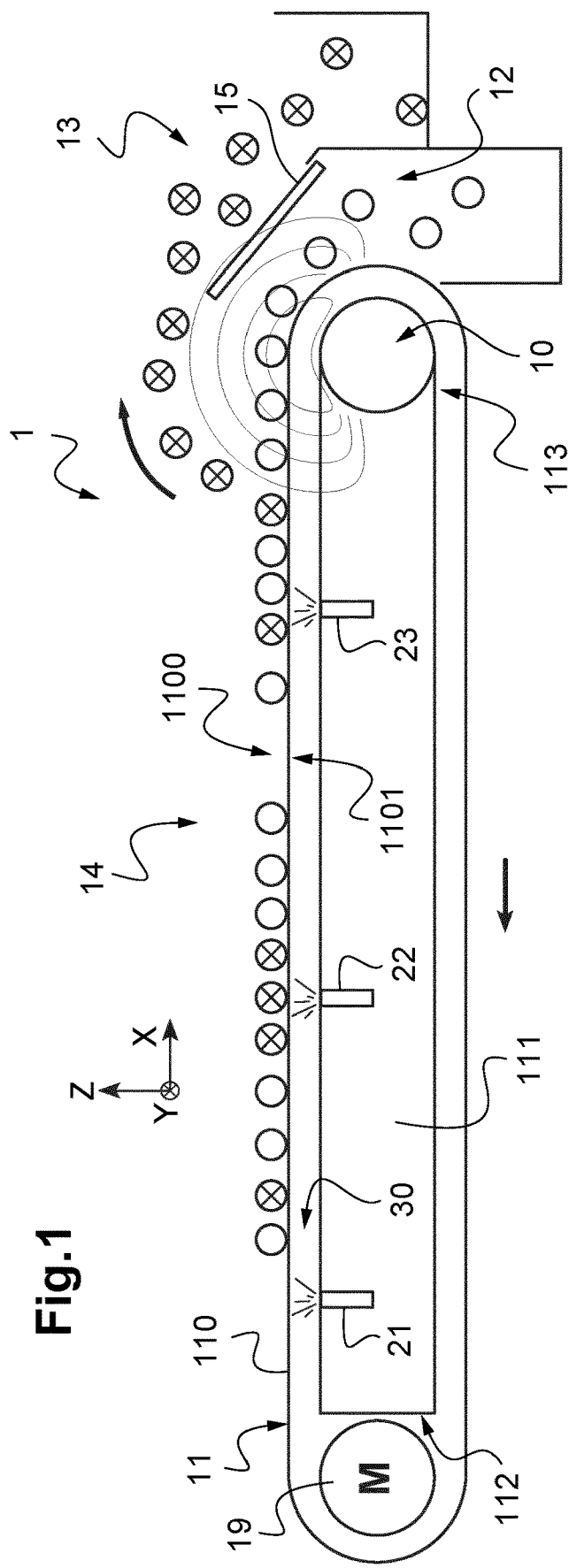
FIG. 1 is a schematic side view of a material separation system according to a first embodiment of the invention.

In a first embodiment of the invention, according to FIG. 1, a material separator system 1 comprises a separation device 10 to separate material from a stream of material.

In this first embodiment the separator is an Eddy Current Separator, which is used to separate non-ferrous metal from other materials.

This embodiment is given for small grain material, which will be referred hereafter as grinded and graded material, in a partially wet or dry mixture, for instance up to 50% of particles with a diameter under 10 mm, and up to 30% of particles with a diameter under 4 mm.

The material is conveyed up to the separation device 10 by a conveying device 11.

The conveying device 11 comprises a support table 111 on which a conveying belt 110, also abbreviated as belt 110, is mounted translatable.

The conveying belt 110 is driven by a motor 19 which drive the belt in translation.

The conveying belt is forming a loop around the support table 111, translating over the support table 111, along a longitudinal axis X from a first end 112 to a second end 113, conveying on that side the stream of material 14 to separate, and returning under the support table 111 from the second end 113 to the first end 112.

Such conveying belt convey translate over the whole length of the support table 111, on a length comprised between 1 meter to 6 meters, in this embodiment a 4 meters long support table 111, even if this length is given only to the purpose of example.

A conveying belt is usually made of a semi-flexible material, like polyurethane (PU) or PVC, layered or not with other synthetics textiles.

Such conveying belt 110, in the purpose of this embodiment is usually from 0.5 meter to 3 meters wide, for instance here a 1.5 meters width.

The thickness of the conveying belt 110 has generally a thickness from 0.5 mm to 10 mm.

The belt 110 conveys the material at a speed from 0.1 up to 3.5 meters/second, in this example a 3 m/s speed. The selected speed must be constant during all the sorting process.

Indeed, the Eddy-Current separator 10 is mounted at the vicinity of the second end 113, and is generating and Eddy-Current applying a repulsive force to the non-ferrous metal material in the stream of material 14.

Therefore, when the stream of material 14 reaches the second end 113 of the conveying belt 11, the non-ferrous material is projected over a splitter device 15, while the other material is falling down under the splitter device 15.

Therefore, in order to obtain an optimal separation of these two kind of material, the splitter 15 is positioned next to the second end 113 of the conveying belt 11 in function of the type of material, especially the grain size of the material, and of the speed of the belt, as the projection of the grains of non-ferrous-material is directly function of the weight of the grains and the speed of the belt.

That's why a constant speed of the belt is requested to ensure the highest rate of separation.

However, when the conveying belt receive small grain material to sort, it is very common that grains seeps beneath the conveying belt 110, between said belt 110 and the support table 111. This generates unexpected friction, along with wear, humidity and temperature changes, that change the instantaneous velocity of the conveying belt 110 and that generates instabilities, generating a reduction of the quality of the sorting process. Especially, the speed change makes some non-ferrous metals falling under the splitter device 15 when they are intended to go over it.

To measure a speed variation of the conveying belt 110, different kinds of sensors can be implemented.

In this embodiment of the invention, the speed variation is detected by tracking the electric current consumed by the motor 19 driving the conveying device 11.

Nevertheless, the invention can instead implement a tachometer to measure the belt speed directly, also called instantaneous velocity, an incremental measuring wheel-encoder also to measure the conveying belt 110 speed directly. The invention is not limited to these specifics sensors or measure method and can be adapted to all other relevant sensors and method to measure the speed variation of the conveying belt 110.

To avoid speed variation of the conveying belt 110, an air flow is blown between the conveying belt 110 and the support table 111, in order to create an air-cushion 30 eliminating frictions of the conveying belt 110 with small grains that seeped beneath it.

Figure 2:
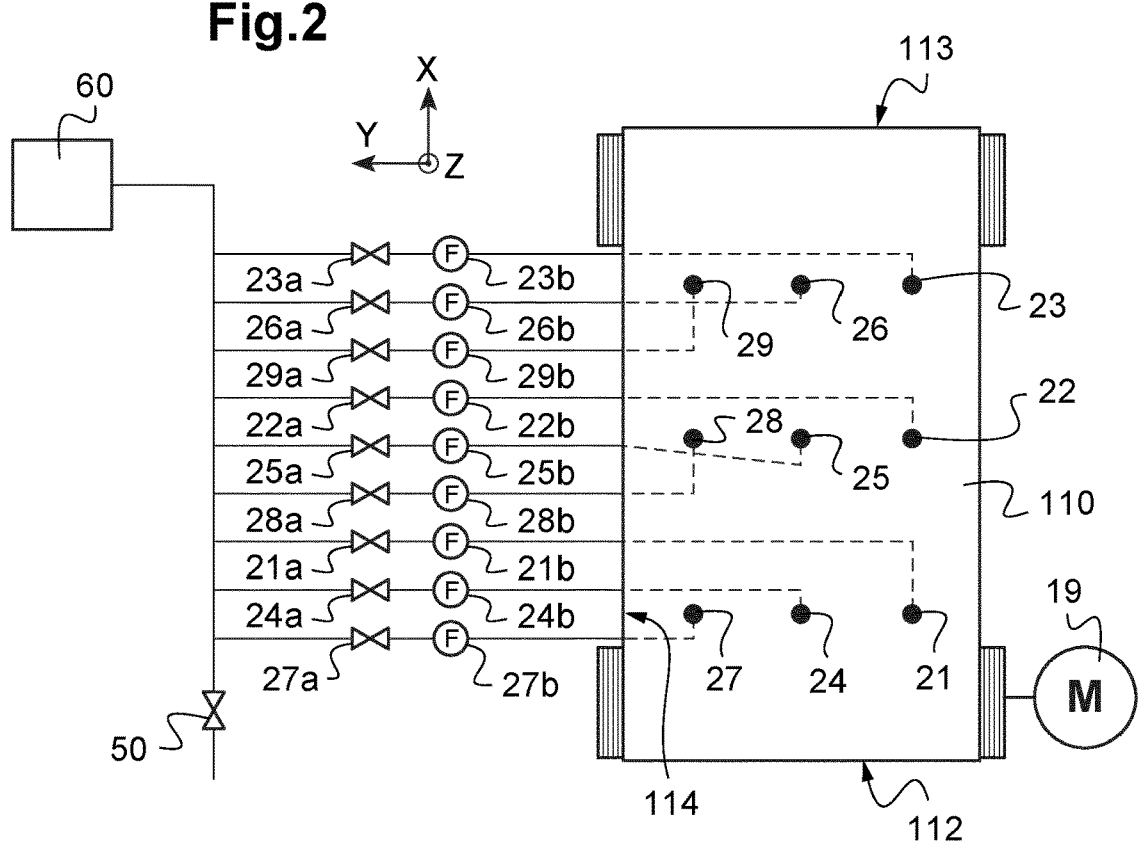
FIG. 2 is a schematic top view of the material separation system of the FIG. 1.

To this purpose, in this embodiment, as represented FIGS. 1 and 2, a plurality of air nozzles 21-29, also abbreviated as nozzles 21-29, are installed in the support table 111, so that the ends of these nozzles emerge from the surface of the table, facing the inner side 1101 of the conveyor belt. The inner side 1101 of the conveyor belt 110 being the side of the belt opposed to the outer side 1100 on which the material to sort lay.

The nozzles emerge from the surface of the table but remain on the same plan. Therefore, the nozzles here do not protrude from the plane of the surface of the table, even if it is a possible implementation of this invention.

In this arrangement the nozzle emerge sensibly from the surface of the table in vertical direction Z. However, the invention is not limited to a vertical-oriented nozzle. It can for instance be oriented obliquely in regard of the plane of the support table 111.

In this arrangement, the opened end of each nozzle arises from the surface of the support table 111.

Each air nozzle 21-29 comprises an opened end blowing the air in a spray adapted to spread on approximatively 360° when the air flow hit the inner surface of the belt.

For this air outlet, the dimensions should be between 2 mm and 20 mm, with a circular shape.

However, any nozzle shape can be implemented, for instance square shaped nozzles.

The nozzles are arranged in a matrix shape, for instance a matrix of 9 nozzles 21-29 regularly distributed beneath the conveying belt 110.

It is understood that the matrix shape is a configuration where the nozzles are separated in a plurality of groups, for each group the nozzles are forming a row in a transversal Y direction and the different groups a regularly dispatched along the longitudinal direction X. Therefore, the nozzles are distributed in a rows and columns arrangement.

The matrix shape in this configuration allow the nozzles 21-29 to be positioned in a way that there is an equal amount of space between the nozzles 21-29 and the endings of the support table 111, in the longitudinal direction X as well as in the transversal direction Y.

For instance, in this 4 meters long and 1.5 meters wide conveying belt 110, the first row of nozzles 29, 26, 23 is spaced for 1 meter of the second end 113 of the support table 111, and the nozzles of the row are separated from each other by a 37.5 cm transversal Y space, the first nozzle 29 of the row being spaced from a lateral side 114 of the support table 111 by 37.5 cm, as well as the last nozzle 23 of the row with the opposed lateral side.

The second row of nozzles 28, 25, 22, is separated longitudinally X with the first row form a 1 meter distance, and the nozzles are in-line with the nozzles of the first row 29, 26, 23. This longitudinal space is also applied for the third row 27, 24, 21 from the second row, and as a result the third row 27, 24, 21 is distant from the first end of the support table 111 by 1 meter. As a consequence, we obtain a regular distribution of the nozzles on the support table 111 beneath the conveying belt 110.

The invention is not limited to this particular number of air nozzles, which can be comprised from 1 single air nozzle up to tens of nozzle, in function amongst others of the dimension of the conveying belt, his weight, and the weight of the materials conveyed by the belt.

The matrix shape is not the only distribution possible, but it's preferred to have a regular distribution. For instance, an alternate distribution can be a modified matrix distribution where the different rows of nozzles are staggered instead of being in-line.

Each nozzle 21-29 is actuated by an electric valve 21a-29a, so it is possible to control each nozzle 21-29 independently.

However, a main valve 50, is also connected to every electric valve 21a-29a to ensure a general control with the ability to cut-off the general flow if needed.

Each nozzle 21-29, is also associated with a flowmeter 21b-29b to measure the air flow of each nozzle. This is particularly useful in a control process to ensure that each nozzle is correctly working.

As a consequence, when the nozzles 21-29 are all together blowing air, an air cushion 30 is formed between the support table 111 and the conveying belt 110, removing the potential frictions of the unexpected grains of material, as well as the potential frictions generated by wear, humidity and temperature changes.

To control the nozzles 21-29 the material separator system comprises means 60 to control the nozzles 21-29 and their associated valves 21a-29a and the main valve 50.

These control means 60 can be a processor, a computer, a micro-controller, a calculator, a DSP or any relevant material able to receive signals from a plurality of sensor, calculate a control signal and emit the control signal to the valves 21a-29a, 50 associated to the nozzles 21-29.

The control means 60 are configured to implement an automation method of the material separation system 1.

The automation of the system 1 described can be implemented in different ways.

Figure 5:
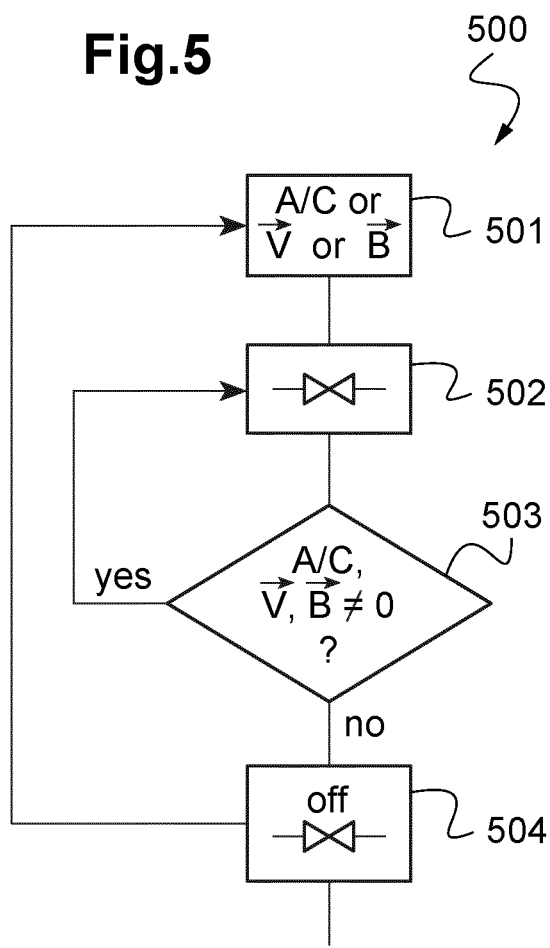
FIG. 5 is a flowchart of a second control method according to the invention.

A first method 500 of the automation method, as represented FIG. 5, comprises a first step of detecting 501 the activity of the Eddy-Current activation.

When it is detected the method 500 implements a step of opening 502 each valves 21a-29a and the main valve 50.

Therefore, this first embodiment of the automation does not require any control on the speed of the conveying belt 110, but require that the control means 60 can receive a signal of activation of the Eddy-Current separator 10, or more generally any separation device 10 implemented by the system 1.

The method 500 is then keeping active the air-flow of each nozzle 21-29 until it is verified 503 that the Eddy-Current separator 10 is turned off.

As a consequence, in this first embodiment of the automation method, the valve 21a-29a of each nozzle 21-29 is closed 504 as soon as the Eddy-Current separator 10 is turned off.

An alternate embodiment, represented in the same FIG. 5, is that instead of detecting the activation of the separation device 10, the control means 60 detects the start of the conveying belt, which is usually prior to the start of the separation device 10. Therefore, the valves 21a-29a, 50 are opened as soon as the belt 110 starts and stops when the belt 110 stops.

Another alternate embodiment of this same automation method of FIG. 5, can be to detect the general power supply of the material separation system. In this method, as soon as the general separation system 1 is electrically powered, the valve command is initiated.

The automation method 500 of FIG. 5 can also be implemented with different kind of detection, for instance cameras or sensors detecting the presence of material on the belt.

As alternative embodiments of the invention, the automation method 500 can be implemented with other starting criteria, like an on-line quality analysis of the incoming stream of material 14 to be sorted.

Figure 4:
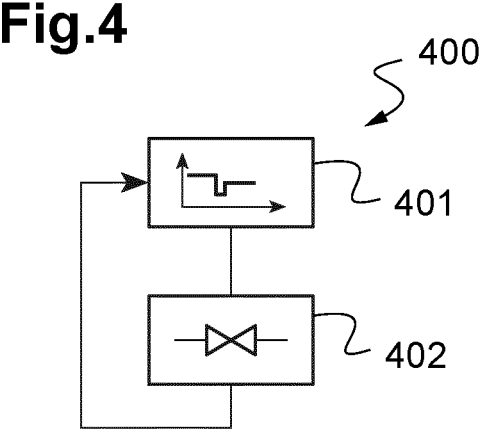
FIG. 4 is a flowchart of a first control method according to the invention.

A second embodiment, represented in FIG. 4, of the control method of the material separation system 1 is to detect conveyor belt speed instability.

The method 400 of the second embodiment implements a first step of detecting 401 a conveying belt 110 instability.

This instability can be detected by different methods, for instance we can acquire and track the current value of the motor 19 driving the conveying belt. When this current is experiencing a significant variation, for instance a 0.2 A variation on a 1.5 A driving current, it is detected that an unexpected effort is applied on the conveying belt 110, which is detected as a friction of the belt 110 on the support table 111.

But some other instability detection can be implemented as instantaneous velocity measure with a tachometer or an incremental measuring wheel-encoder.

When the instability is detected, the method 400 implements a step of opening 402 each valves 21a-29a and the main valve 50.

An end can be decided by the method, for instance by implementing a timer feature, the valves 21a-29a and 50 being closed after a predetermined time limit.

The predetermined time limit can be calculated as a fixed time lapse after the first detection of the instability.

But as an alternative, we can define the predetermined time limit as a time lapse of stable speed of the conveyor belt, for instance after 10 minutes of stable current consumption of the motor or of constant speed.

Another method can be also implemented based on an online quality analysis of the product.

Further, it is possible to implement an automation method based on artificial intelligence means taking in consideration multiple measurements such as motor current, measured belt speed, presence of product on the belt, etc.

Figure 3:
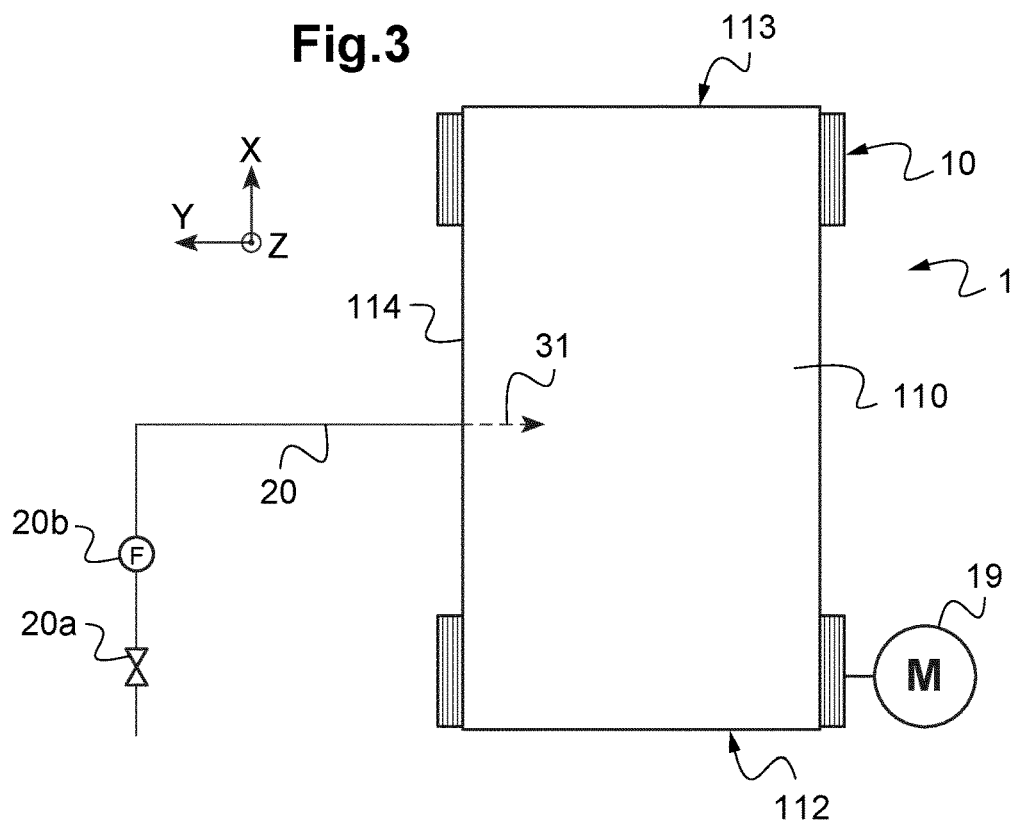
FIG. 3 is a schematic top view of a material separation system according to a second embodiment of the invention.

In a second embodiment of the material separator system 1, according to FIG. 3, comprises a single air nozzle 20 installed on a lateral side 114 of the support table 111, in order to blow air in a transversal direction 31, parallel to the transversal axis Y, in order to create an air-cushion 30 between the conveying belt 110 and the support table 111.

In this embodiment the air nozzle 20 is associated with a valve 20a and a flowmeter 20b like the valves of the first embodiment of the invention.

Indeed, the automation methods described for the first embodiment also applies for this second embodiment.

In an alternative embodiment of this second embodiment, a plurality of air nozzles can be installed regularly along the longitudinal direction X of the support table 111, with air nozzles 20 installed on a lateral side 114 of the support table 111, in order to blow air in a transversal direction 31, parallel to the transversal axis Y.

The transversal orientation of the air nozzles gives a supplementary advantage to clean and remove more efficiently the materials that seeped between the conveying belt 110 and the support table 111.

None of these embodiments are limited to the sole use of an Eddy-Current separator 10 as separation device 10. The invention and the described embodiments can also be embedded with any kind of separation devices 10 like NIR device, XRF device, separation devices based on imagery, air blowing separators, since the conveyor belt 110 speed remains an important parameter of the efficiency of the system.

Moreover, the different methods 400, 500 for controlling a material separator system can combine different detection steps, with different detection means, such as means for detecting motor current, measured belt speed, presence of product on the belt, on-line quality of the incoming stream of material.

Such detection steps combining different detection means can for instance be based on an artificial intelligence module, as an artificial neural network, Decision trees, SVM method, or any other automatic learning method, combining multiple input data as motor current, measured belt speed, presence of product on the belt, on-line quality of the incoming stream of material.

The invention also relates to a method for separating a stream of material, for instance incinerator bottom ashes, also called IBA, with the material separator system of any embodiment of the invention, comprising the steps of:
  starting the conveyor belt 110;
  after the conveyor belt 110 is started, then starting the separation device 10;
  Especially when the separation device 10 is an Eddy-Current separator, it is usual to start the conveyor belt before it, in order to avoid potential Eddy current damage to the belt, e.g. when metals unfortunately remain on the belt, which can cause burns.

However, with a different implementation of the separation device 10, it can be considered to start the conveyor belt 110 at the same time, before or after the separation device 10.

Then the method comprises a step of providing near a first end 112 of the support table 111 a stream of material, for instance a grinded or graded stream of material.

From this point, it is implemented one of the methods 400, 500 for controlling a material separator system as exposed previously, where it is detected a speed variation of the conveyer belt 110, and if a significant speed variation is detected, by a current variation, tachometer on any other means, it is started to create the air-cushion between the support table 111 and the conveyor belt 110, by blowing air with the air nozzles 20-29.

A timer is then started to determine when to stop the air nozzles 20-29.

The air nozzles 20-29 being for instance stopped, for instance, after a fixed time from the start of the air nozzles 20-29 or after a continuous time during which no significant speed variation of the belt is detected.

In the meantime, the material separation process is running as long as needed. During the material separation process, the methods 400, 500 for controlling a material separator system as exposed previously may be run a plurality of time, as often as a significant speed variation of the belt is detected.

As an alternative, air may be blown to generate the air-cushion as described previously during the entire material separation process.

The invention claimed is:

1. A material separator system comprising:
a separation device to separate at least a first group and a second group of material from an incoming stream of material;
a conveying device to convey said incoming stream of material to the separation device, said conveying device comprising a motorized conveyor belt translating over a support table, the stream of material laying on the conveyor belt and being carried along a longitudinal axis to the separation device;
at least one air nozzle configured to blow air between the conveyor belt and the support table in order to create an air-cushion in-between, the at least one air nozzle being disposed on a lateral side of the conveyor belt oriented parallel to the plane of the support table, in a transversal direction, perpendicular to the longitudinal axis.

2. The material separator system according to claim 1, wherein the at least one air nozzle comprises a plurality of air nozzles, mounted regularly on the side of the conveyor belt along the longitudinal axis.

3. A method for controlling a material separator system including a separation device to separate at least a first group and a second group of material from an incoming stream of material, a conveying device to convey said incoming stream of material to the separation device, and at least one air nozzle configured to blow air between the conveyor belt and the support table in order to create an air-cushion in-between, said conveying device including a motorized conveyor belt translating over a support table, the stream of material laying on the conveyor belt and being carried along a longitudinal axis to the separation device, the method comprising:
detecting an instability of the speed of the conveyor belt; and
activating the at least one air nozzle when said instability is detected.

4. The method according to claim 3, wherein the instability is detected by one or more of (i) tracking the current variation of a motor driving the conveyor belt and tracking an instantaneous velocity of the conveyor belt.

5. The method according to claim 3, further comprising stopping the at least one air nozzle after a predetermined time limit.

6. The method according to claim 5, wherein the predetermined time limit is a fixed period of time after the activation of the at least one air nozzle or a continuous period of time after said activation during which no instability of the conveyor belt speed is detected.

7. A method for controlling a material separator system including a separation device to separate at least a first group and a second group of material from an incoming stream of material, a conveying device to convey said incoming stream of material to the separation device, and at least one air nozzle configured to blow air between the conveyor belt and the support table in order to create an air-cushion in-between, said conveying device including a motorized conveyor belt translating over a support table, the stream of material laying on the conveyor belt and being carried along a longitudinal axis to the separation device, the material comprising:
detecting an activation of the conveyor belt or the activation of the separation device or the power supply of the material separator system; and
activating the at least one air nozzle to blow the air between the conveyor belt and the support table in order to create an air-cushion in-between when said activation or the power supply is detected.

8. The method according to claim 7, further comprising stopping the at least one air nozzle after a fixed period of time starting from the activation of the at least one air nozzle.

9. A method for an incoming stream of material on a material separating separator system including a separation device to separate at least a first group and a second group of material from an incoming stream of material, a conveying device to convey said incoming stream of material to the separation device, and at least one air nozzle configured to blow air between the conveyor belt and the support table in order to create an air-cushion in-between, said conveying device including a motorized conveyor belt translating over a support table, the stream of material laying on the conveyor belt and being carried along a longitudinal axis to the separation device, the method comprising:
starting the conveyor belt;
starting the separation device;
providing an incoming stream of material to separate on the conveyor belt; and
while the separation device is running, implementing a method for controlling the material separator system, the method for controlling the material separator system comprising
detecting an instability of the conveyor belt speed, and activating the at least one air nozzle when said instability is detected.

10. The method for separating the incoming stream of material according to claim 9, wherein the stream of material comprises or consists of incinerator bottom ashes.

* * * * *

UNITED STATES PATENT AND TRADEMARK OFFICE
CERTIFICATE OF CORRECTION

| | | |
|---|---|---|
| PATENT NO. | : 12,128,423 B2 | Page 1 of 1 |
| APPLICATION NO. | : 18/254335 | |
| DATED | : October 29, 2024 | |
| INVENTOR(S) | : Rik Slabbinck | |

It is certified that error appears in the above-identified patent and that said Letters Patent is hereby corrected as shown below:

On the Title Page

Item (73) Assignee, Please change "VIGIE GROUP" to --VIGIE GROUPE--.

Signed and Sealed this
Second Day of December, 2025

John A. Squires
*Director of the United States Patent and Trademark Office*